United States Patent
Cunico et al.

(10) Patent No.: US 10,606,943 B2
(45) Date of Patent: Mar. 31, 2020

(54) FAULT INJECTION IN HUMAN-READABLE INFORMATION

(71) Applicant: International Business Machines Corporation, Armonk, NY (US)

(72) Inventors: Hernan A. Cunico, Holly Springs, NC (US); Paul Alexander Raphael Frank, Berlin (DE); Martin G. Keen, Cary, NC (US); Adam J. Smye-Rumsby, Reading, PA (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/727,857

(22) Filed: Oct. 9, 2017

(65) Prior Publication Data
US 2019/0108212 A1 Apr. 11, 2019

(51) Int. Cl.
*G06F 17/27* (2006.01)

(52) U.S. Cl.
CPC .......... *G06F 17/273* (2013.01); *G06F 17/274* (2013.01); *G06F 17/2785* (2013.01)

(58) Field of Classification Search
CPC .... G06F 17/273; G06F 17/274; G06F 17/275; G06F 16/93
See application file for complete search history.

(56) References Cited

U.S. PATENT DOCUMENTS

| | | | |
|---|---|---|---|
| 4,994,966 A | 2/1991 | Hutchins | |
| 5,111,398 A | 5/1992 | Nunberg et al. | |
| 6,618,697 B1 | 9/2003 | Kantrowitz et al. | |
| 7,640,158 B2 | 12/2009 | Detlef et al. | |
| 8,126,882 B2* | 2/2012 | Lawyer | G06Q 10/063 707/723 |
| 8,150,842 B2* | 4/2012 | Brougher | G06Q 10/063 707/723 |
| 8,645,396 B2* | 2/2014 | McNally | G06Q 10/063 707/748 |
| 9,208,140 B2 | 12/2015 | Luke | |
| 2004/0006483 A1 | 1/2004 | Sasaki | |
| 2006/0053001 A1 | 3/2006 | Brockett | |

(Continued)

FOREIGN PATENT DOCUMENTS

EP   0466516   1/1992

OTHER PUBLICATIONS

Hsueh et al., "Fault injection techniques and tools," Computer, vol. 30, Issue: 4, Apr. 1997, 8 pages.

(Continued)

*Primary Examiner* — Michael N Opsasnick
(74) *Attorney, Agent, or Firm* — VanLeeuwen & VanLeeuwen; Alexander G. Jochym

(57) ABSTRACT

An approach is provided in which a fault-injecting system injects a natural language fault into a first text segment to produce a second text segment that are both written in a natural language. The fault-injecting system receives a third text segment from a reviewer that includes at least one correction to the second text segment. The fault-injecting system compares the third text segment against the first text segment and generates an efficacy score. The efficacy score indicates whether the correction in the third text segment corrects the natural language fault. In turn, the fault-injecting system sends the efficacy score to an author of the first text segment.

11 Claims, 9 Drawing Sheets

(56) References Cited

U.S. PATENT DOCUMENTS

| | | |
|---|---|---|
| 2008/0221722 A1 | 9/2008 | Popp |
| 2009/0157667 A1* | 6/2009 | Brougher ............ G06Q 10/063 |
| 2010/0332217 A1* | 12/2010 | Wintner ............... G06F 17/271 |
| | | 704/9 |
| 2014/0059078 A1 | 2/2014 | Gulwani |
| 2016/0098389 A1 | 4/2016 | Bruno |
| 2016/0378748 A1* | 12/2016 | Shoshan .......... G06Q 10/06395 |
| | | 704/2 |
| 2017/0109346 A1* | 4/2017 | Shoshan ........ G06Q 10/063112 |
| 2017/0144758 A1 | 5/2017 | Myslinski |
| 2018/0285326 A1 | 10/2018 | Goyal |
| 2019/0108212 A1* | 4/2019 | Cunico ................ G06F 17/273 |
| 2019/0108213 A1* | 4/2019 | Cunico ................ G06F 17/273 |

OTHER PUBLICATIONS

Some et al., "A software implemented fault injection methodology for design and validation of system fault tolerance," International Conference on Dependable Systems and Networks, Jul. 1-4, 2001, 6 pages.

Do et al., "Fault Injection Technique for Evaluating Erlang Test Suites," University of Gothenburg, Department of Applied Information Technology Gothenburg, Sweden, May 2009, 19 pages.

"List of IBM Patents or Patent Applications Treated as Related," Letter from Leslie A. Van Leeuwen, Dec. 20, 2017, 1 page.

Cunico et al., "Fault Injection in Human-Readable Information," U.S. Appl. No. 15/848,506, filed Dec. 20, 2017, 35 pages.

\* cited by examiner

510

"From 1993-2012, Company A inventors received nearly 67,000 U.S. patents, and in 2012 alone, received a record 6,478 patents, exceeding the combined totals of Company B, Company C, and Company D. Most important, these inventions have a huge impact on clients, partners and society.
They show Company A's long-term, strategic commitment to innovation and demonstrate the patience to allow scientific discovery to find its way into the market. Read on to learn more about a few of Company A's 6,478 patents granted in 2012."

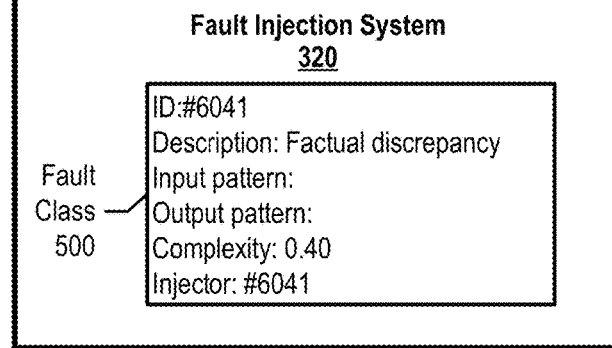

Fault Class 500 — Fault Injection System 320
ID:#6041
Description: Factual discrepancy
Input pattern:
Output pattern:
Complexity: 0.40
Injector: #6041

"From 1993-2012, Company A inventors received nearly 67,000 U.S. patents, and in 2012 alone, received a record 6,478 patents, exceeding the combined totals of Company B, Company C, and Company D. Most important, these inventions have a huge impact on clients, partners and society. They show Company A's long-term, strategic commitment to innovation and demonstrate the patience to allow scientific discovery to find its way into the market. Read on to learn more about a few of Company A's 4,876 patents granted in 2012."

User Interface Window 900

SEGMENT CONFIGURATION

ASSIGNMENT TYPE
- ☐ Automatic
- ☒ Manual

| SEGMENT | Noun Swap | Noun Substitution | Factual Discrepancy | Sentiment Modifier |
|---|---|---|---|---|
| Segment A | ☒ | ☐ | ☐ | ☐ |
| Segment B | ☐ | ☐ | ☐ | ☒ |
| Segment C | ☐ | ☐ | ☒ | ☐ |

PRIORITY
- Segment A: 1
- Segment B: 2
- Segment C: 2

*FIG. 9*

FAULT INJECTION IN HUMAN-READABLE INFORMATION

BACKGROUND

Automated spelling and grammar checking technology allows authors to deliver document drafts to a reviewer or editor with minimal typographical and basic grammatical errors. A spell checker scans a document and compares each word with a known list of correctly spelled words from a dictionary. A grammar checker attempts to verify written text for grammatical correctness based on whether the sentence is produced and interpreted in accordance with rules and constraints of relevant grammar (singular form, plural form, etc.).

However, despite advances in technology, humans still play a vital role in reviewing a document's quality, such as its content, context, sentiment, factual consistency, etc. As such, authors typically use spell checkers and grammar checkers to remove typographical and grammatical errors, and then send the document to a human reviewer to review the document from a content, context, and overall document quality standpoint.

BRIEF SUMMARY

According to one embodiment of the present disclosure, an approach is provided in which a fault-injecting system injects a natural language fault into a first text segment to produce a second text segment that are both written in a natural language. The fault-injecting system receives a third text segment from a reviewer that includes at least one correction to the second text segment. The fault-injecting system compares the third text segment against the first text segment and generates an efficacy score. The efficacy score indicates whether the correction in the third text segment corrects the natural language fault. In turn, the fault-injecting system sends the efficacy score to an author of the first text segment.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is a diagram showing a fault injection system applying a factual discrepancy fault class to a text segment;

FIG. 9 is an exemplary diagram depicting a user interface window that allows a document author to configure the fault injection system.

DETAILED DESCRIPTION

Figure 1:
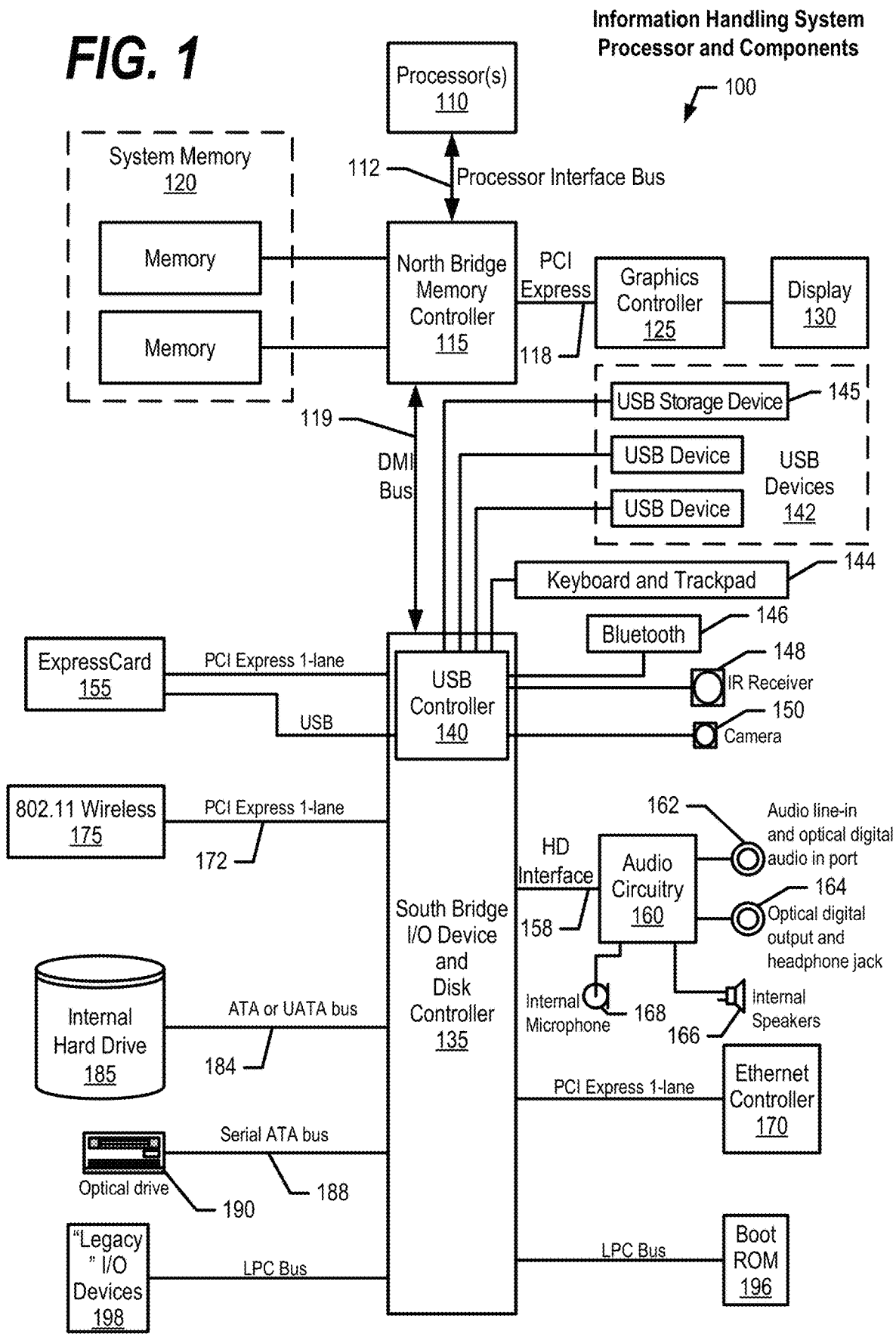
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
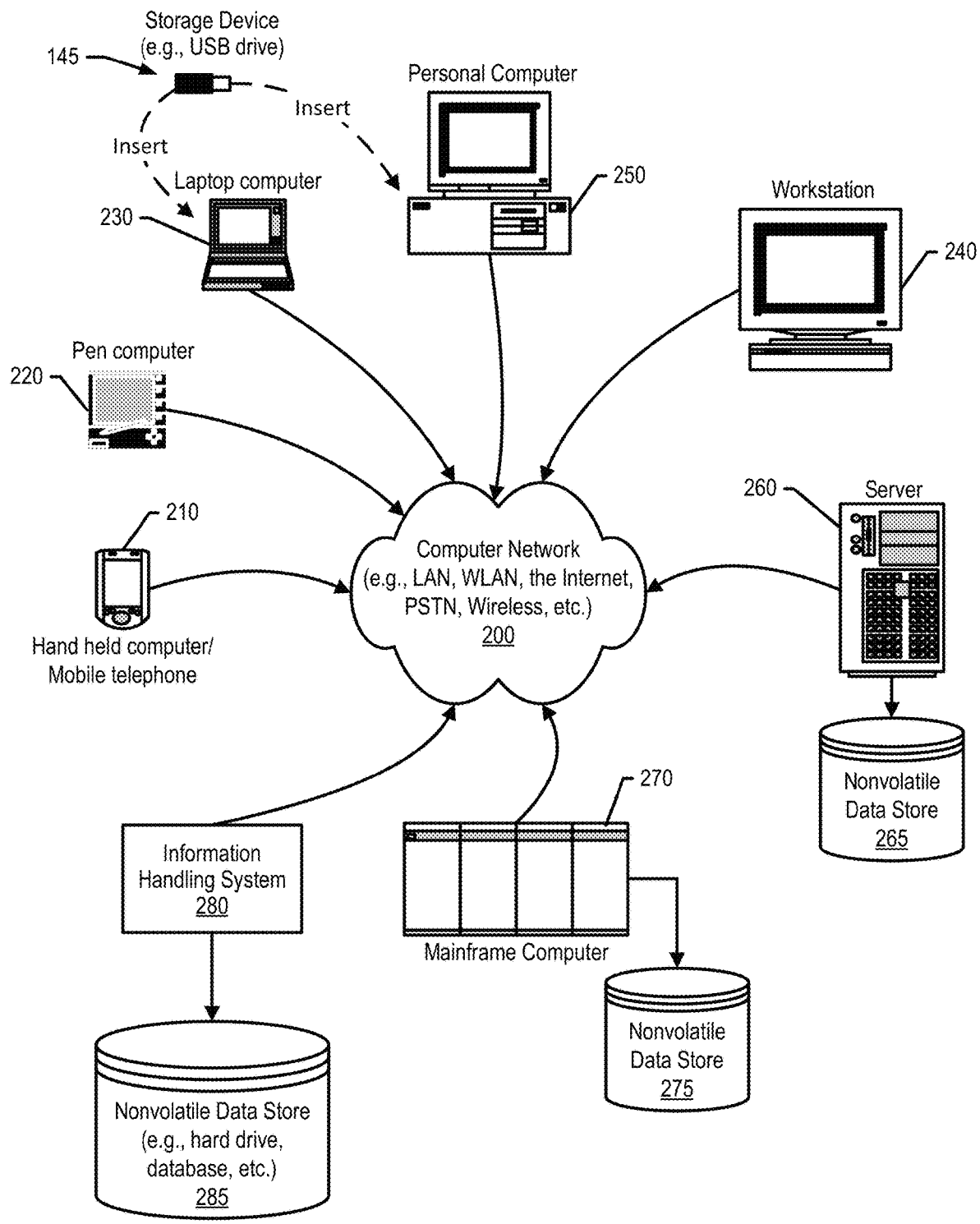
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3 through 9 depict an approach that can be executed on an information handling system. As discussed above, a document author depends upon reviewers to review documents and identify errors other than spelling errors or grammatical errors. Some reviewers are very thorough while other reviewers are not as thorough. Unfortunately, prior art does not indicate to the author as to how well the reviewer reviewed the document. As discussed herein, a natural language fault injection system intentionally injects natural language faults into a document and compares the fault-injected document with a reviewer's corrections to the fault-injected document to determine how well the reviewer reviewed the fault-injected document. As defined herein, a natural language is a language that has evolved naturally in humans and is not to be construed as constructed or formal languages used to program computers. And, as defined herein, a natural language fault alters the contextual meaning of a text segment (the meaning of the text segment) by performing actions such as swapping nouns, changing facts, changing the sentiment of a text segment, etc.

Figure 3:
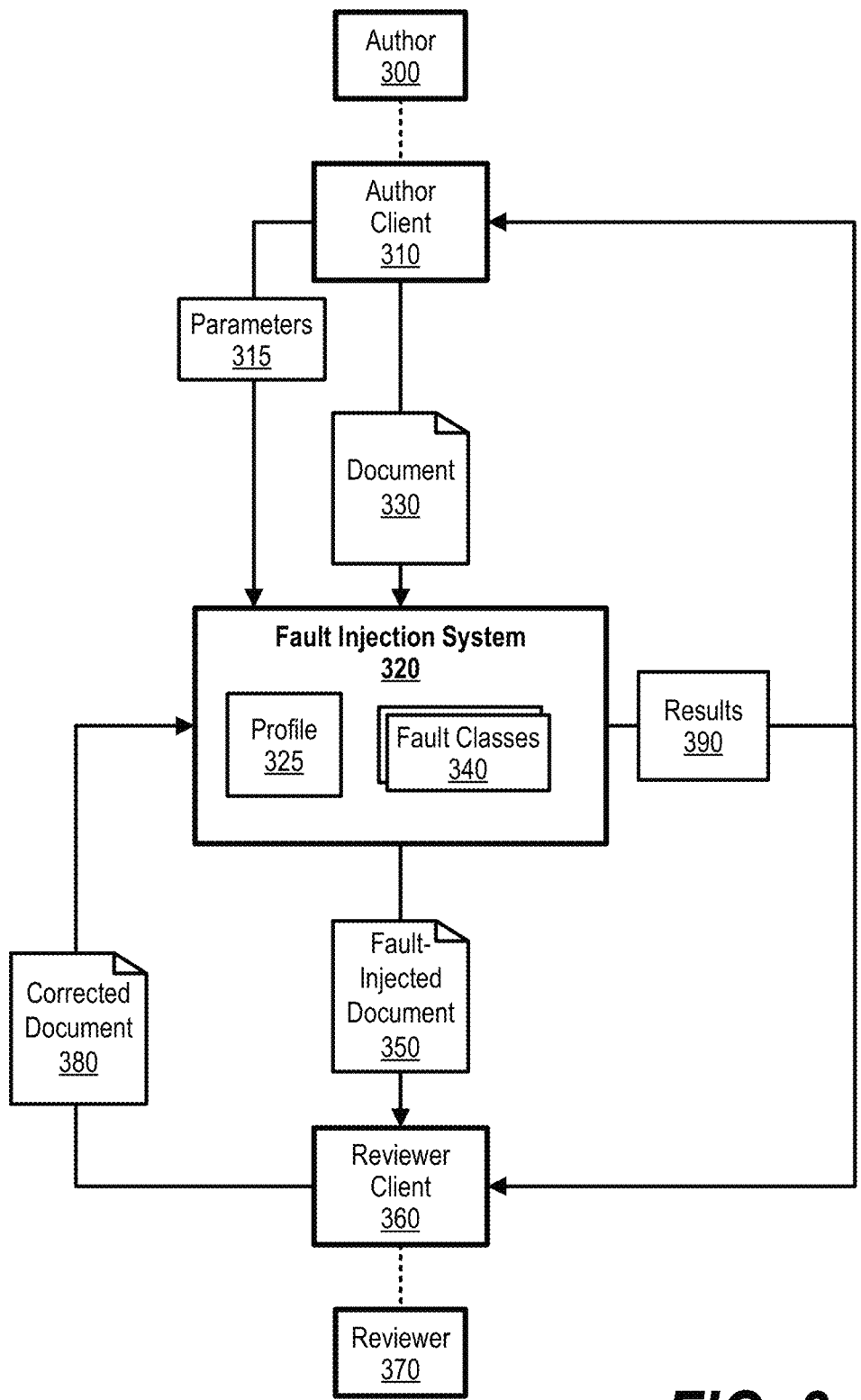
FIG. 3 is a high level diagram depicting a fault injection system injecting faults into a document and analyzing a reviewer's effectiveness of correcting the injected faults.

FIG. 3 is a high level diagram depicting a fault injection system injecting faults into a document and analyzing a reviewer's effectiveness of correcting the injected faults. As discussed herein, the injected faults are natural language faults that are based on a natural language. For example, an injected fault may swap nouns in a sentence, change factual statements in a paragraph, modify the sentiment in a sentence, etc.

Author 300 uses author client 310 to create document 330. Author 300 also configures fault injection system 320 for fault injection by sending parameters 315 via author client 320 to fault injection system 320, which fault injection system 320 stores in profile 325. Fault injection system 320 may provide a suitable user interface to allow author 300 to manually create, review, update and delete fault injection profiles (see FIG. 9 and corresponding text for further details). In one embodiment, parameters 315 includes information that fault injection system 320 utilizes to automatically identify text segments for which to inject errors, which class of faults to inject, etc. For example, parameters 315 may include information such as:

Proportion of a document to cover/segment
Pages, paragraphs, sentences, clauses, words, entities, etc.
Tokenizer(s) to use
Text segment size/granularity
Number of faults to inject (total number and/or per text segment)
Fault classes to inject and priority order in event of conflict
Relative complexity of faults to inject
Density of faults to inject
Allow combinatorial faults per text segment
Reviewer target time for identifying faults (e.g. configure fault injection so that 95% of reviewers will identify 90% of injected faults within two hours)

Fault injection system 320 ingests document 330 using, for example, existing methods such as reading an input stream from a file on disk. Fault injection system 320 scans document 330 and records relevant metadata such as its title, word count, sentence count, paragraph count, editing time, complexity, etc. Once the document metadata has been recorded, fault injection system 320 partitions passages in document 330 as text segments and marks the text segments for later fault injection. As discussed herein, text segments are contiguous, sequential passages of text, such as a paragraph, several consecutive sentences, or a single sentence. In one embodiment, fault injection system 320 may use a segmenter module to split the text into text segments according to parameters specified in profile 325. For example, profile 325 may specify that a pilcrow (symbol used to mark a new paragraph or section of text) be used to denote the end of a segment. In this embodiment, a tokenizer segmenter searches for the specified token (pilcrow) and splits the text into its constituent strings at each occurrence of the token. Text segments may also be manually defined using various methods such as author 300 clicking and dragging a mouse to select portion(s) of text.

Fault injection system 320 assigns a unique identifier to each text segment. The unique identifier, the starting position, ending position, and length of each text segment are logged for later analysis. Fault injection system 320 may also associate a priority with each segment, which may be set manually by the user or automatically by fault injection system 320. In automatic mode, fault injection system 320 may analyze the text segments to determine a text segment priority based a number of parameters such as:

The number of spelling/grammar errors detected in a segment
The time spent by author 300 editing each segment during the authoring process
Historical data about a target reviewer's ability to identify and correct certain types of errors Fault injection system 320 then selects fault classes 340 to be injected based on profile 325 and document 330 analyses, and assigns priorities to text segments and/or fault classes 340 accordingly. In one embodiment, different fault classes may be assigned to different text segments, either explicitly via user assignment or automatically according to profile 325. As discussed herein, a fault class defines a type of fault to introduce to a segment (see FIGS. 4-6 and corresponding text for further details). In the manual mode, author 300 selects from a list of faults that may be applicable to each segment. The user may also select multiple segments at one time to which to assign the same fault class as a batch operation. Fault injection system 320 may also enable a semi-automatic mode which allows author 300 to manually define the text segments and fault injection system 320 automatically selects and assigns faults to the selected segments according to properties specified in profile 325.

Fault injection system 320 injects various classes of faults discussed herein to create fault-injected document 350, which is sent to reviewer client 360. In one embodiment, fault injection system 320 may send fault-injected document 350 to multiple reviewers, and may also generate multiple fault-injected document 350s, each having their own specific injected faults based on the recipient reviewer.

Reviewer 370 reviews fault-injected document 350 using, for example, a word processing program, and corrects the document as reviewer 370 sees fit to generate corrected document 380. At this point, corrected document 380 includes all of reviewer 370's corrections to fault-injected document 350. Reviewer client 360 sends corrected document 380 to fault injection system 320 for analysis.

Fault injection system 320 compares corrected document with document 330 and generates an efficacy score based on which injected errors were corrected by reviewer 370. In one embodiment, the efficacy score may be based on absolute or relative scoring strategies, or a mixture of both. For example, in an embodiment that seeks to encourage competition among reviewers and reward quantity as well as quality of reviews, fault injection system 320 may award points to a reviewer for each reviewed document where the maximum number of points available to be scored would vary based on the document's complexity, the amount of faults injected, etc.

In another embodiment, fault injection system 320 may apply weightings to different fault classes based on their complexity. For example, identifying and correcting a sentence's sentiment may have a higher weighting than identifying and correcting a noun swap in the sentence. In this embodiment, the complexity factor may reflect an expected relative degree of effort for a reviewer to identify a type of fault compared to other types of fault. The complexity factor may be defined during fault definition as a fixed value, or it may be dynamically calculated based on various properties of a text segment to which the fault was assigned.

In yet another embodiment, fault injection system 320 may utilize an absolute scoring strategy that combines the complexity factor for each fault with one or more secondary, variable factors that allow differences in the relative complexity of different texts assigned for review to be reflected in scores. Secondary factors may be assessed at different scopes, such as per-segment level or per-document level, depending on the desired level of granularity. In this embodiment, reviewer 370 may be awarded an efficacy score based on a theoretical maximum value that would vary for each reviewed text based on variables such as:

Reading difficulty level
Length of segment/text. (Longer texts carry a higher maximum possible score, as a reviewer needs to maintain concentration longer)
Average sentence length of segment/text
Average word length of sentences in the segment/text Degree of repetition of words in a segment/text. (Texts with less repetition of words should carry a higher maximum possible score, as there are more unique words for reviewer to comprehend)

In another embodiment, fault injection system 320 may utilize a relative scoring strategy to award a scaled score out of a maximum 100, regardless of the relative complexity of a text. In this embodiment, factors that contribute to the awarded score may include:

Percentage of faults corrected by reviewer 370

Complexity of faults corrected by reviewer 370 (e.g., A reviewer may receive a higher score if they identified 10 faults across a broad range of fault classes compared to a reviewer who found 10 of the same type of simple fault)

Closeness of corrections when compared to document 330

In yet another embodiment, fault injection system 320 may utilize rules and parameters from profile 325 to guide efficacy scoring computations. For example, a parameter may define whether synonyms appearing in corrected text 355 will be accepted in lieu of the precise words that appeared in document 330. In a setting where synonyms are permitted, another parameter may define which thesaurus is utilized to determine the closeness of corrections. A threshold may be set for each dimension of comparison beyond which the two sequences are considered sufficiently similar as to match, or a score may be assigned reflecting the absolute degree to which the two sequences are similar for the given dimension.

Fault injection system 320 includes the efficacy score into results 390 and provides results 390 to reviewer 370 and/or author 300 via reviewer client 360 and/or author client 310, respectively. In addition to the overall efficacy score, results 390 may include additional details of score components, such as the number of found faults alongside number of total faults introduced e.g. 54/75, or a detailed listing of each introduced fault and how the reviewer fared in correcting it (see FIG. 8 and corresponding text for further details).

In one embodiment, fault injection system 320 may optionally support a "blind review" by anonymizing reviewer scores so that fault injection system 320 does not directly identify a particular reviewer to author 300 (nor the author to the reviewer). In this embodiment, the blind review may involve fault-injected document 350 being made available to multiple reviewers or allowing a most effective reviewer from a pool of available reviewers to be selected based on historical efficacy scores instead of allowing more subjective factors to interfere with selecting a preferred reviewer (e.g., friends).

Fault injection system 320 also creates a record of the score and associates the score with reviewer 370. In one embodiment, fault injection system 320 learns from the latest efficacy score and makes adjustments accordingly. In this embodiment, to increase coverage of fault injection for automatically assigned faults, fault injection system 320 studies historical records of author 300's manually assigned faults that were injected into text segments, such as whether author 300 manually favored adding noun swap fault classes, sentiment modifier fault classes, etc. to a given text segment. By analyzing how faults are manually selected by author 300 for injection into segments over time, fault injection system 320 can automatically recreate similar fault injection patterns that mimics author 300's manual selection.

Fault injection system 320 may also learn from efficacy scoring and adapt to a particular author and/or reviewer. In this embodiment, fault injection system 320 studies historical records of a given reviewer to derive the reviewer's particular strengths and weaknesses, such as which faults in which text segments the reviewer has a high success factor in correcting, and which faults/segments the reviewer has a low success factor in correcting. If a reviewer is routinely finding particular faults in a particular segment, there is little value in continuing to add the particular faults in the text segments. Instead, fault injection system 320 would adapt over time to add specific faults into specific segments that pose a greater challenge to the reviewer. This is a continual self-learning process whereby fault injection system 320 studies a reviewer's performance, adapts fault injection based on the performance, measures the reviewer's performance of the new fault injection patterns, modifies fault injection again, and etcetera.

In one embodiment, fault injection system 320 may iterate over the text at the known location of each introduced fault. Text or numeric sequences at the location of each injected fault is inspected. It may be determined whether the expected number of characters are present. The sequence at the location, which may be a "corrected segment," may be compared to the text of the faulty segment; if both sequences are identical, the fault was not corrected, and hence it may be assumed that the reviewer did not identify the error. In this case, a zero or other appropriate minimum score can be assigned for the review of this segment. If the textual or numeric sequences at the location differs for the fault-injected text that was provided to a reviewer, fault injection system 320 may compare the sequence at the location with the original, unmodified text. In some cases, e.g., a noun swap fault or a factual discrepancy fault, if both are identical, it may be determined that the fault was identified and corrected; a maximum score can be awarded for this segment accordingly. If not, the textual or numeric sequences at the location may be evaluated across one or more dimensions to determine how closely the corrected text matches the original text, for example:

Degree of synonymousness where words differ

Sentiment similarity of original segment compared to corrected segment

Length similarity

Reading level similarity

In another embodiment, fault injection system 320 uses a cognitive service to perform psycho-linguistic analysis of a corrected segment to assess its sentiment. Rather than evaluating the text or numeric sequence at a location, the cognitive service will instead cause the fault injector to evaluate the overall sentiment of the appropriate portion of the document. Examples of cognitive services that perform psycho-linguistic analysis of text to assess sentiment include Microsoft Azure Cognitive Services Text-Analytics API, Google Cloud Natural Language API, and IBM Watson Tone Analyzer API.

Figure 4:
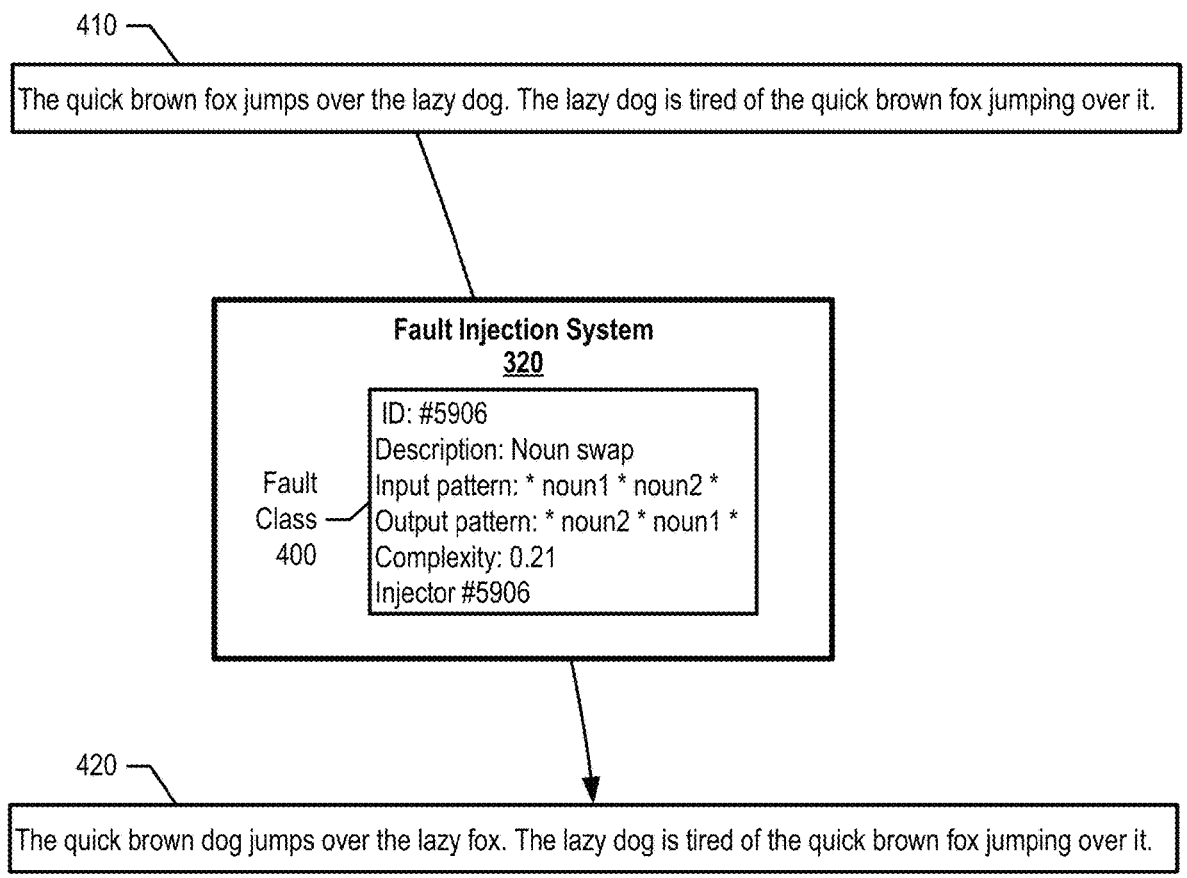
FIG. 4 is a diagram showing a fault injection system applying a noun swap fault class to a text segment.

FIG. 4 is a diagram showing a fault injection system applying a noun swap fault class to a text segment. Fault class 400 analyzes text segment 410 and "swaps" nouns where appropriate. FIG. 4 shows that "The quick brown fox jumps over the lazy dog" is changed to "The quick brown dog jumps over the lazy fox" in fault-injected text segment 420. Reviewer 370 should determine that fault-injected text segment 420 does not make sense as a whole and should make corrections accordingly.

FIG. 5 is a diagram showing a fault injection system applying a factual discrepancy fault class to a text segment. As discussed herein, a factual discrepancy is a discrepancy in a fact relative to other facts in a document or text segment. Fault class 500 analyzes a text segment and modifies facts where appropriate. FIG. 5 shows that the last sentence in text segment 510 is changed from "Read on to learn more about a few of Company A's 6,478 patents granted in 2012" to "Read on to learn more about a few of Company A's 4,876 patents granted in 2012." in fault-injected text segment 520. As such, reviewer 370 should realize that fault-injected text segment 520 includes factual discrepancies and should make corrections accordingly.

Figure 6:
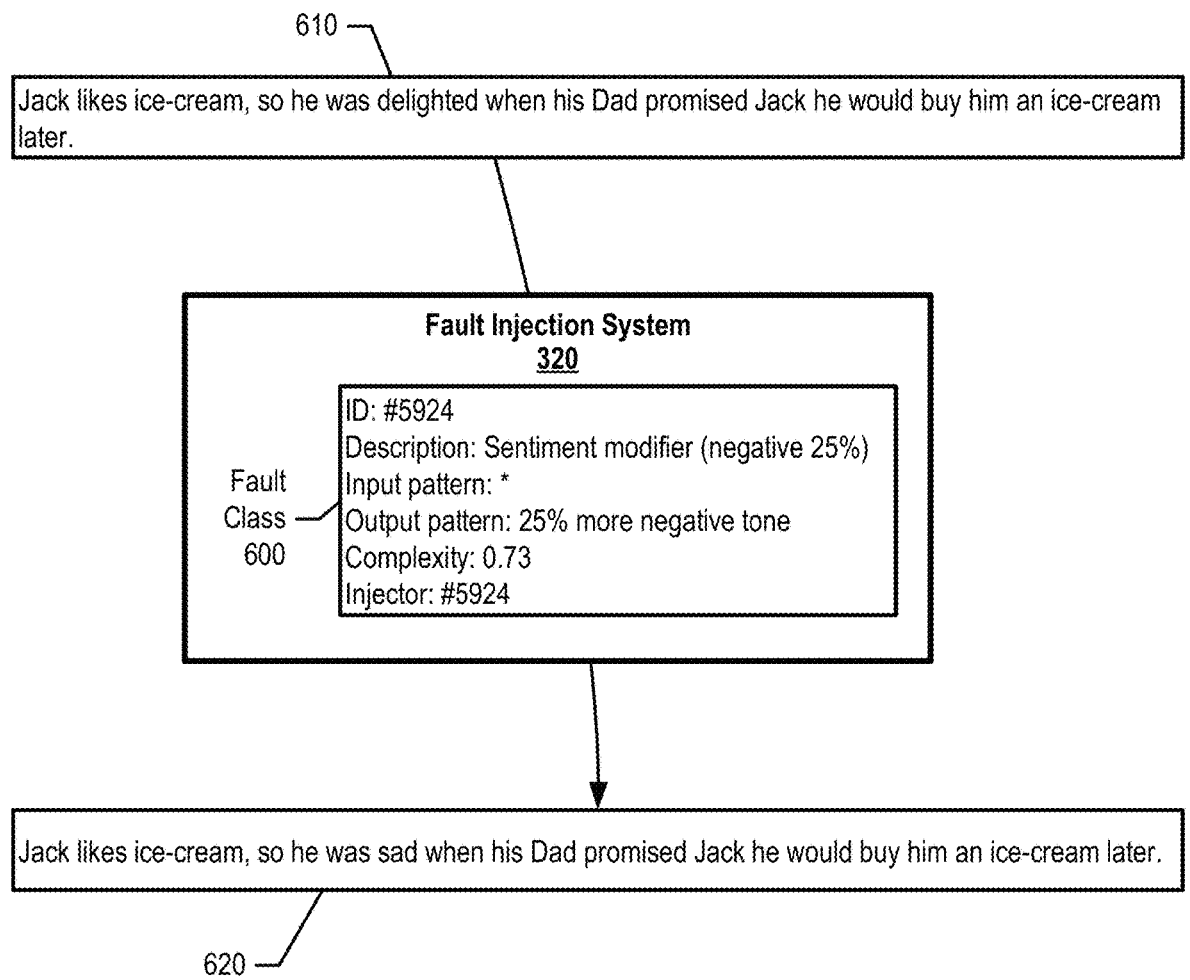
FIG. 6 is a diagram showing a fault injection system applying a sentiment modifier fault class to a text segment.

FIG. 6 is a diagram showing a fault injection system applying a sentiment modifier fault class to a text segment. Fault class 600 is a sentiment modifier that causes fault injection system 320 to evaluate an overall sentiment of text segment 610, such as a positive sentiment, negative sentiment, or neutral sentiment, and dynamically modify one or more elements of the text segment as necessary to achieve a desired result (i.e. fault class 600 modifies a 25% change in the tone of the segment toward being more negative). Using fault class 600, fault injection system 320 changes the phrase "so he was delighted" in text segment 610 to the phrase "so he was sad" in fault-injected text segment 620. Reviewer 370 should detect that corrections are needed to fault-injected text segment 620 because if Jack likes ice-cream, then Jack should not be saddened by the promise of ice-cream.

In one embodiment, fault injection system 320 uses a cognitive service to perform psycho-linguistic analysis of an original segment in order to assess its sentiment. The cognitive service returns a composite of the emotions of joy, fear, sadness, disgust and anger using a real number between 0 and 1 for each emotion that contributes to overall sentiment. This insight allows fault injection system 320 to modify the original text in order to achieve precise changes in sentiment by repeating the analysis for the fault-injected text to verify the fault-injected text corresponds to the parameters of the fault class.

Figure 7:
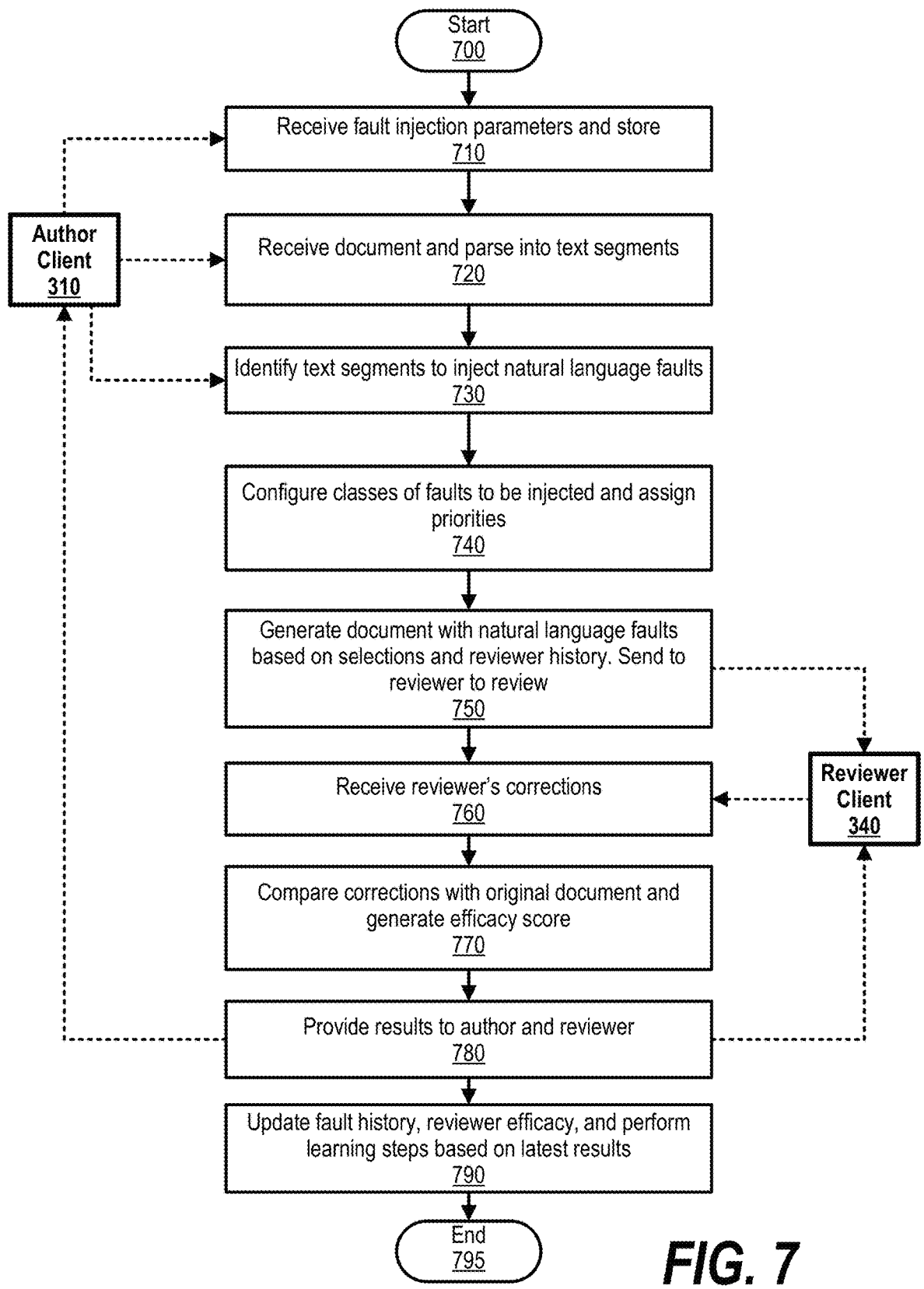
FIG. 7 is a flowchart showing steps taken to inject faults into a document and analyze a reviewer's capability to correct the injected faults.

FIG. 7 is a flowchart showing steps taken to inject faults into a document and analyze a reviewer's capability to correct the injected faults. FIG. 7 processing commences at 700 whereupon, at step 710, the process receives fault injection parameters 315 from author 300 via author client 310 and stores the parameters in profile 325. As discussed above, parameters 315 includes information that fault injection system 320 utilizes to automatically identify text segments for which to inject errors, which class of faults to inject, etc.

At step 720, the process receives document 330 and parses document 330 into text segments. As discussed above, fault injection system 320 may parse the document according to the parameters stored in profile 325. The process, at step 730, identifies text segments for which to inject faults. This step may be performed via manually (e.g. author 300 selecting text segments via a mouse) or automatically based on the parameters stored in profile 325.

At step 740, the process identifies fault classes to be injected into the selected text segments and assigns priorities to the text segments and/or fault classes. At this step, fault classes may be assigned to segments, either explicitly via user assignment, or automatically according to profile 325.

At step 750, the process generates fault-injected document 350 using the identified fault classes. In one embodiment, fault injection system 320 modifies an in-memory stream of characters representing the text by replacing segments of the text with replacement segments containing suitable faults.

Reviewer 370 reviews fault-injected document 350 and, at step 760, the process receives reviewer 370's corrected document 380 via reviewer client 340. At step 770, the process compares corrected document 380 against document 330 and generates an efficacy score using techniques discussed above.

At step 780, the process provides results 390 to author client 310 and/or reviewer client 360. As discussed above, fault injection system 320 may optionally support a "blind review" by anonymizing reviewer scores so that fault injection system 320 does not directly identify the reviewer to the author (nor the author to the reviewer) but rather allows only an independent third party to know either the author and/or reviewer's identity.

At step 790, the process updates the fault history, the reviewer's cumulative efficacy score, and learns from the latest results. For example, as discussed above, fault injection system 320 may learn from author 300's selections and reviewer 370's corrections to make adjustments for future fault-injected document reviews. FIG. 7 processing thereafter ends at 795.

Figure 8:
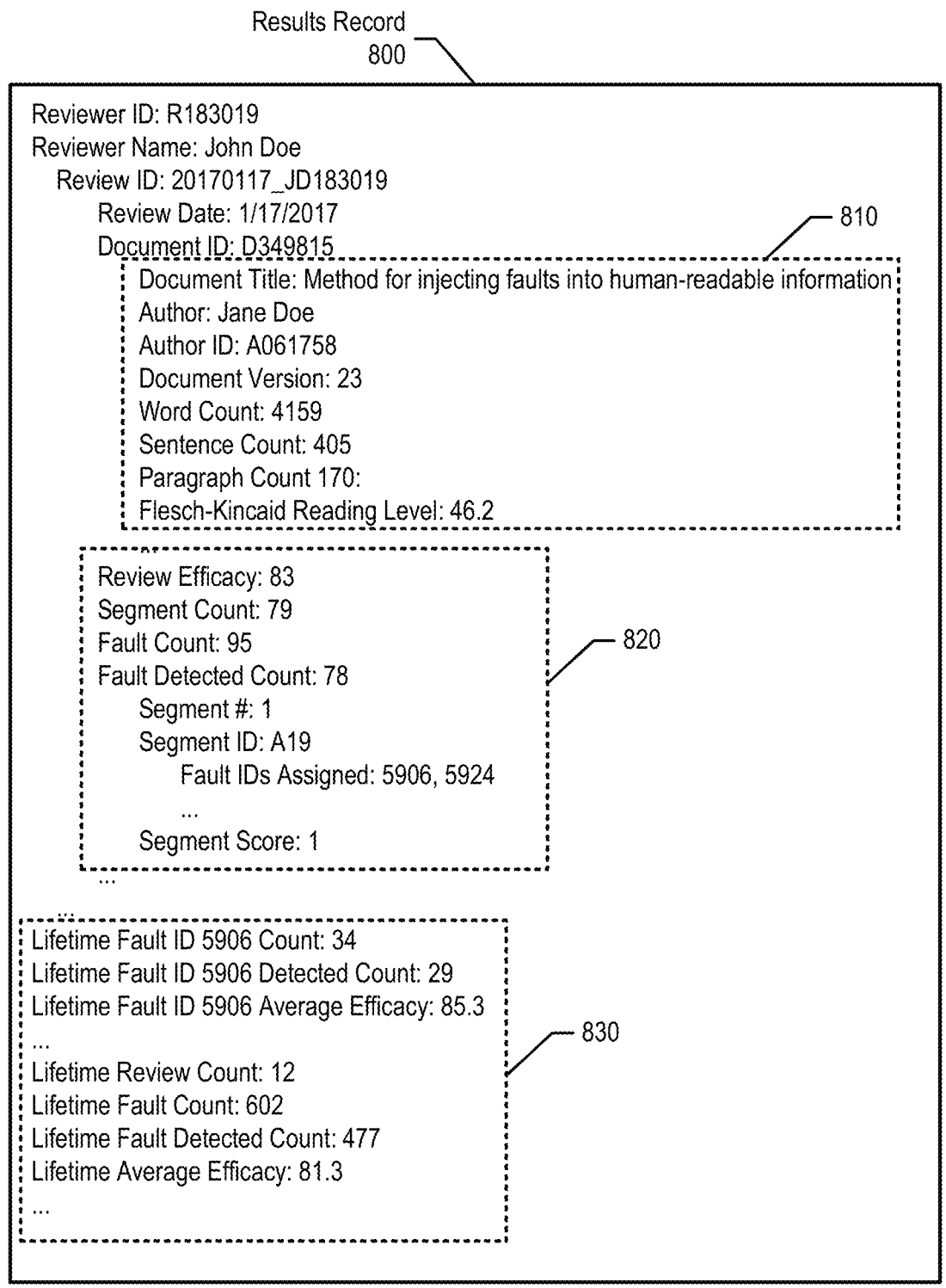
FIG. 8 is a diagram showing an example of a results record that indicates an effectiveness of the reviewer to review a fault-injected document.

FIG. 8 is a diagram showing an example of a results record that indicates an effectiveness of the reviewer to review a fault-injected document. Section 810 includes information pertaining to a recently reviewed document such as the document's title, author, word count, and etcetera. Section 820 includes the efficacy score of the reviewer's review along with specific text segment information such as which type of faults were injected on a per-segment basis. Section 830 includes cumulative information for the reviewer such as the amount of times the reviewer corrected particular fault classes, the reviewer's cumulative efficacy score, etc.

FIG. 9 is an exemplary diagram depicting a user interface window that allows a document author to configure the fault injection system. User interface window 900 includes an area for author 300 to select a manual fault-injection assignment or an automatic fault-injection. When the user selects a manual fault-injection, user interface window 900 also allows the user to specify particular fault classes to particular segments. In one embodiment, user interface window 900 displays particular text segments while author 300 assigns the fault classes to the displayed text segments. User interface window 900 also allows author 300 to set priorities for fault-injection on a per-text segment basis. User interface window 900 may also include other selection areas for author 300 to provide parameters to fault injection system 320 as discussed herein.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   a set of computer program instructions stored in the memory and executed by at least one of the processors in order to perform actions of:
      analyzing, by a natural language fault injection system, a first text segment sent from an author client, wherein the analyzing produces a set of analysis results;
      selecting a first fault class, from a plurality of fault classes, based on comparing the analysis results against a set of parameters, wherein each of the plurality of fault classes define one of a plurality of types of faults to inject into the first text segment;
      injecting, by the natural language fault injection system, a natural language fault, based on the selected first fault class, into the first text segment to produce a second text segment, wherein the first text segment and the second text segment are written in a same natural language;
      selecting a reviewer from a plurality of reviewers based on the selected first fault class;
      sending, by the fault injection system, the second text segment to a reviewer client corresponding to the reviewer;
      receiving, at the fault injection system, a third text segment from the reviewer client, wherein the third text segment comprises at least one correction to the second text segment by the reviewer;
      generating, by the fault injection system, an efficacy score by comparing the third text segment against the first text segment, wherein the efficacy score indicates whether the reviewer corrected the natural language fault included in the second text segment;
      updating a reviewer profile of the reviewer based on the efficacy score; and
      selecting the reviewer to review an upcoming text segment based on the updated efficacy score.

2. The information handling system of claim 1 wherein the processors perform additional actions comprising:
   determining that the first fault class is a noun swap fault class; and
   swapping a first noun in the first text segment with a second noun in the first text segment based on the first rule to produce the second text segment.

3. The information handling system of claim 1 wherein the processors perform additional actions comprising:
   determining that the first fault class is a factual discrepancy fault class; and
   modifying at least one fact in the first text segment based on the first rule to produce the second text segment.

4. The information handling system of claim 1 wherein the processors perform additional actions comprising:
   determining that the first fault class is a sentiment modifier fault class; and
   modifying a sentiment of the first text segment based on the first rule to produce the second text segment.

5. The information handling system of claim 1 wherein the processors perform additional actions comprising:
   injecting a different natural language fault into a different first text segment based on the updated reviewer profile to produce a different second text segment; and
   sending the different second text segment to the reviewer to review.

6. The information handling system of claim 1 wherein the processors perform additional actions comprising:
   injecting a different natural language fault into the first text segment to produce a different second text segment, wherein the different natural language fault is based on a second fault class from the plurality of fault classes;
   selecting a different reviewer based on the second fault class; and
   sending the different second text segment to the different reviewer to review.

7. A computer program product stored in a non-transitory computer readable storage medium, comprising computer program code that, when executed by an information handling system, causes the information handling system to perform actions comprising:
   analyzing, by a natural language fault injection system, a first text segment sent from an author client, wherein the analyzing produces a set of analysis results;
   selecting a first fault class, from a plurality of fault classes, based on comparing the analysis results against a set of parameters, wherein each of the plurality of fault classes define one of a plurality of types of faults to inject into the first text segment;
   injecting, by the natural language fault injection system, a natural language fault, based on the selected first fault class, into the first text segment to produce a second text segment, wherein the first text segment and the second text segment are written in a same natural language;
   selecting a reviewer from a plurality of reviewers based on the selected first fault class;
   sending, by the fault injection system, the second text segment to a reviewer client corresponding to the reviewer;
   receiving, at the fault injection system, a third text segment from the reviewer client, wherein the third text segment comprises at least one correction to the second text segment by the reviewer;
   generating, by the fault injection system, an efficacy score by comparing the third text segment against the first text segment, wherein the efficacy score indicates whether the reviewer corrected the natural language fault included in the second text segment;
   updating a reviewer profile of the reviewer based on the efficacy score; and
   selecting the reviewer to review an upcoming text segment based on the updated efficacy score.

8. The computer program product of claim 7 wherein the information handling system performs further actions comprising:
   determining that the first fault class is a noun swap fault class; and
   swapping a first noun in the first text segment with a second noun in the first text segment based on the first rule to produce the second text segment.

9. The computer program product of claim 7 wherein the information handling system performs further actions comprising:
   determining that the first fault class is a factual discrepancy fault class; and
   modifying at least one fact in the first text segment based on the first rule to produce the second text segment.

10. The computer program product of claim 7 wherein the information handling system performs further actions comprising:
    determining that the first fault class is a sentiment modifier fault class; and
    modifying a sentiment of the first text segment based on the first rule to produce the second text segment.

11. The computer program product of claim 7 wherein the information handling system performs further actions comprising:
    injecting a different natural language fault into a different first text segment based on the updated reviewer profile to produce a different second text segment; and
    sending the different second text segment to the reviewer to review.

* * * * *